April 23, 1968 W. T. FISHER 3,379,097
ROCKET LAUNCHING
Filed Jan. 17, 1966 2 Sheets-Sheet 1

INVENTOR
WILLIAM THOBY FISHER
BY
ATTORNEYS

April 23, 1968  W. T. FISHER  3,379,097
ROCKET LAUNCHING
Filed Jan. 17, 1966  2 Sheets-Sheet 2

INVENTOR
WILLIAM THOBY FISHER
BY
Bailey, Stephens & Huettig
ATTORNEYS

United States Patent Office 3,379,097
Patented Apr. 23, 1968

3,379,097
ROCKET LAUNCHING
William Thoby Fisher, Somerset, England, assignor to Bristol Aerojet Limited, Somerset, England, a company of Great Britain
Continuation-in-part of application Ser. No. 348,637, Mar. 2, 1964. This application Jan. 17, 1966, Ser. No. 521,095
Claims priority, application Great Britain, Mar. 18, 1963, 6,464/63
4 Claims. (Cl. 89—1.816)

ABSTRACT OF THE DISCLOSURE

A rocket launcher comprising a tube containing a rocket and a separate apertured piston member behind the rocket, the tube having an annular flange wall at its rear end bounding an aperture through which propulsion gases from the rocket pass straight through to uncontained atmosphere.

---

This application is a continuation-in-part of application Ser. No. 348,637, filed March 2, 1964, now abandoned, in the name of William Thoby Fisher and entitled "Rocket Launching,"

This invention is concerned with rockets which are launched from a tube in which they are accelerated from a static position.

In a known arrangement the tube is completely open at the rear end; that is to say, the bore in the tube extends right through the tube. The rocket may therefore be inserted into the tube through the rear end.

We have found that the gas discharge from the rocket, which is commonly from a single central nozzle at the rear end of the rocket, tens to draw out with it air from behind the rocket, and therefore creates a partial vacuum at the rear end of the rocket, around the nozzle. Owing to this partial vacuum and to the presence of atmospheric pressure at the front end of the rocket, there is a net retarding force on the rocket while in the tube due to the pressure differential. The magnitude of this force depends, of course, on the cross sectional area of the rocket. If this is considerably less than that of the tube, then the rocket is usually located in the tube by one or more guide members, which also experience a retarding force, and transmit it to the rocket.

It is also known to launch a rocket from a tube of which the rear end is completely closed or is only vented through long passages having right angled bends in them. In such cases a high pressure is built up in the initial stages of launch giving rise to a high acceleration peak. This high peak is undesirable for two reasons. Firstly it causes the rocket to attain a comparatively high velocity early in its passage up the tube. This causes the pressure behind the rocket to fall rapidly later in the passage of the rocket up the tube and this pressure may become negative as the rocket approaches the open end of the tube so that the mean acceleration and hence the launching velocity will be relatively low. It will also be appreciated that most rockets today contain relatively delicate apparatus and/or instruments which severly restrict the maximum acceleration which they will tolerate. In some cases the nature of the fuel may limit the permitted acceleration.

Accordingly it is an object of the invention to provide a rocket launcher which will produce during rocket launch an acceleration of the rocket which is approximately constant.

Another object is to obtain a high launching velocity with a low maximum acceleration.

We have found that these objects can be achieved by providing at the rear end of the tube a transverse wall, in which is a hole larger in area than the nozzle, but substantially smaller in area than the cross-sectional area of the tube, and by associating the rocket with a piston-like member which serves to transmit forward thrust to the rocket upon the creation of super-atmospheric gas pressure in the rear part of the tube.

As an alternative to a single central nozzle, the rocket may have a group of two or more nozzles. In this case there may be a corresponding number of holes in the rear wall of the tube, or these holes may be merged into a single hole. For example, if the rocket has a pair of nozzles, there may be a single hole of oval outline.

In general, with a rocket and launcher according to this invention it is possible to keep the pressure behind the rocket at a positive value throughout launching, and thereby obtain a high launching velocity for any given maximum permissable acceleration. The maximum permissable acceleration is liable to be determined by the nature of the contents of the rocket. For example, if the rocket carries meteorological instruments, there is a definite maximum acceleration which the instruments will withstand. Moreover the tube of the launcher may, if desired, be made considerably longer than hitherto, with a resultant further increase in launching velocity.

We find that, during the initial part of the travel of the rocket along the tube, almost all of the discharge from the nozzle passes out through the hole in the transverse wall, and only a small part of the discharge serves to build up a pressure in the tube behind the piston. As the rocket proceeds along the tube, the discharge spreads more widely in relation to the hole in the transverse wall, and therefore the greater proportion of the discharge tends to remain within the tube thus promoting an increase in pressure within the rear part of the tube. However, although the rate of discharge from the nozzle may increase, the fact that the rocket is accelerating ensures that the pressure does not rise to an excessive amount.

The accompanying drawings show two examples of launcher and rocket in accordance with the present invention. In these drawings.

Figure 1:
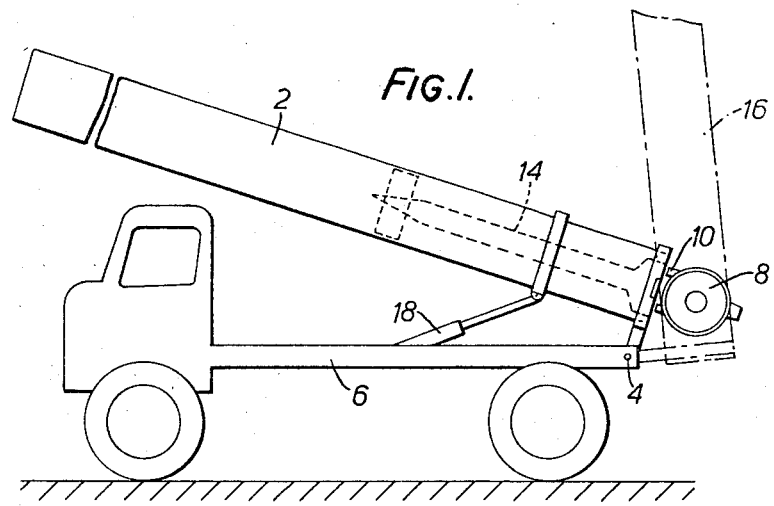
FIGURE 1 is a diagrammatic side elevation of a launcher mounted on a vehicle.
Figure 2:
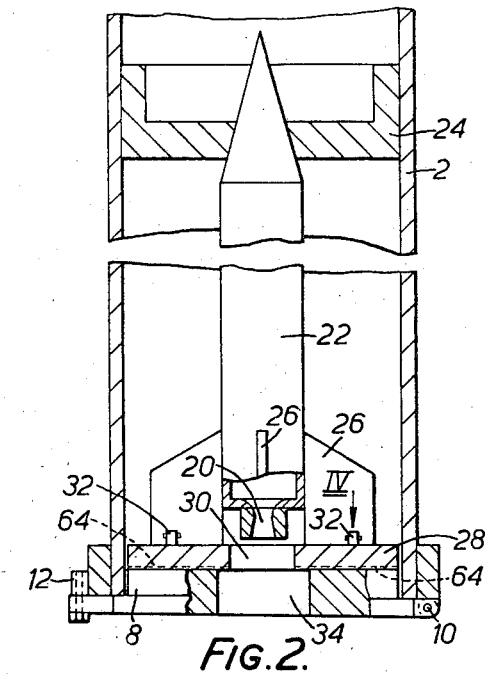
FIGURE 2 is a fragmentary longitudinal section of the rocket and launcher.

The launcher shown in FIGURES 1 and 2 consists of a tube 2 pivotally mounted at 4 on a vehicle chassis 6. A transverse wall 8 is joined to the rear end of the tube by a hinged connection 10, and, upon releasing a locking mechanism 12, it can be swung into an open positive as indicated in FIGURE 1. Thereupon, with the tube in the attitude shown in solid lines in FIGURE 1, a rocket can be inserted into the rear end of the tube to the position indicated at 14. The transverse wall 8 is then closed, and locked, and the tube is elevated to the position shown in broken lines 16 by means of a jack 18, ready for launching of the rocket.

Figure 3:
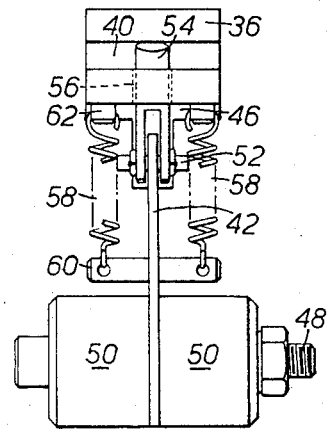
FIGURE 3 is a plan view to enlarge scale of one of the four inertia-operated releasable latches connecting the piston-like member to the fins of the rocket viewed in the direction of the arrow III shown in FIGURE 2.
Figure 4:
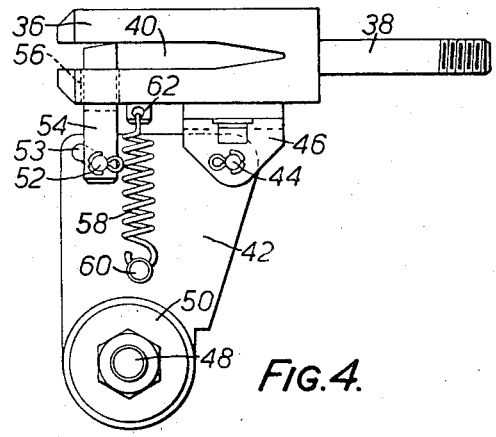
FIGURE 4 is a side elevation of the releasable latch shown in FIGURE 3.

FIGURE 2 shows the rocket in position ready for launching with the transverse wall 8 of the launcher closed by the locking mechanism 12. The rocket has a central propulsion nozzle 20 at its rear end. It has a body 22 considerably smaller in diameter than the bore of the tube, and it is located coaxially with the tube by a guide member 24 around its nose. This guide member is of expanded polystyrene and disintegrates during launching. At its rear end, the rocket has radial stabilising fins 26. Immediately behind the fins 26 is a piston 28 in the form of a disc with a central hole 30, somewhat larger in diameter than the nozzle so as not to interfere with the discharge from the nozzle. The member abuts against the rear edges of the fins 26 and each fin is fastened thereto by an inertia-operated releasable latch 32, one of which is shown in detail in FIGURES 3 and 4. The latch includes a block 36 carrying a threaded stud 38 which passes through a hole in the piston 38 to which it is fastened by means of a nut (not shown). The block 36 is slotted at 38 to receive the lower edge of one of the fins of the rocket. An approximately triangular plate 42 is pivoted near one corner on a pin 44 carried by a bracket 46 fastened to the side of the block 36. A bolt 48 passes through the plate 42 near the corner remote from the block 36 and secures two weights 50 to the plate. Near the third corner of the plate a clevis pin 52 passing through a slot 53 in the plate connects a bolt 54 to the plate. The bolt slides in a bore 56 in the block 36 on one side of the slot 40 and, in the position shown, extends across the slot 40 through a hole in the fin 26 (which is omitted from FIGURES 3 and 4 for reasons of clarity). A pair of tension springs 58 fastened at one end to a pin 60 passing through the plate 42 and at the other end to bored screws 62 fixed to the block 36 bias the plate to the position shown with the bolt through the hole in the fin in the slot 40.

As shown in FIGURE 2, a number of radially extending grooves 64 are formed in the under surface of the piston 28.

The rocket and launcher operate as follows during launch. When the rocket is ignited propulsion gases are generated and are discharged through the nozzle 20. Because of the relative diameters of the nozzle 20 and the holes 30 and 34 these gases initially pass straight through the holes 30 and 34 substantially without restriction from the transverse wall 8. The rocket will begin to travel up the launching tube taking with it the piston 28 because, as the rocket begins to move, the acceleration of the rocket is insufficient to cause the inertia-operated latches 32 to open. Lifting of the piston is assisted by a very small proportion of the propulsive gases which finds its way into the grooves 64 and so builds up pressure in the grooves. The acceleration builds up and at a certain level the weights 50 are caused to lag sufficiently to overcome the bias of the springs 58 and the plate pivots about the pin 44 to draw the bolt 54 out of the hole in the fin and release the piston from the rocket. The bolt 54 is drawn out of the bore 54 and swings clear so that it is not re-inserted on any subsequent reduction of acceleration.

The jet of propulsive gases diverges so that as the distance between the nozzle and the transverse wall 8 increases as the rocket travels up the tube the edges of the jet impinge more and more on the margins of the hole 34 in the transverse wall 8 so that a pressure is built up in the tube 2 behind the rocket. This pressure holds the piston 28 against the rocket and provides thrust to the rocket. Thus the increasing resistance built up ahead of the rocket is compensated by an increase in pressure behind the rocket and the ejective effect of the propulsive gases passing out of the rear end of the tube is counteracted. The increasing volume behind the rocket and the increasing rate at which this is formed due to the increasing velocity at which the rocket travels up the tube is approximately balanced by the increasing proportion of the gases of the jet which impinge on the transverse wall around the hole 34 as the rocket travels up the tube due to the divergence of the jet. This produces a substantially constant acceleration of the rocket from shortly after it begins to move until the rocket leaves the launcher, so producing the maximum possible velocity of the rocket when it leaves the launcher for a given maximum permissable acceleration.

The optimum size of the hole in the transverse wall depends on a number of variables. The following figures relate to one particular example:

| | |
|---|---|
| Launching tube internal diameter _____inches__ | 21 |
| Weight of the rocket _____lbs__ | 110 |
| Maximum rocket thrust _____lbs__ | 5000 |
| Average rocket thrust during launching ____lbs__ | 4000 |
| Internal diameter of throat of nozzle ____inches__ | 1.2 |
| Internal diameter of exit end of nozzle ____do____ | 2.2 |
| Internal diameter of hole in transverse wall do____ | 7 to 8 |

We have found that an increase in diameter of the hole above 8 inches leads to a fairly rapidly falling off in launching velocity. A decrease in diameter below 7 inches leads also to a falling off in velocity, and to an excessive initial acceleration.

If it is desired to fire a heavier and more powerful rocket from the same launching tube, then a somewhat larger hole in the transverse wall will produce best results, and provision may then be made for exchanging the transverse wall, or at least the central part of it, for another with a hole of different size.

Although, as has been stated, the optimum size for the hole in the transverse wall depends on a number of variables, it is believed that the useful range for the area of the hole 34 is between five and twenty times the area of the exit end of the nozzle of the rocket. However, in most cases the area of the hole will be less than fifteen times the area of the exit end of the nozzle and the preferred area is about ten times the area of the exit end of the nozzle. As a rough guide it can be stated that this area is likely to be of the order of 1/10 of the area of the cross-section of the tube 2.

In the example shown in FIGURES 1 to 4 of the drawings, the piston 28 is coupled to the rocket by the latches 32. However, as has been explained, pressure builds up in the grooves 64 on the under-side of the piston 28 and also on the annular portion of the under-side of the piston 28 which is not in contact with the transverse wall 8. In addition there will be initially some small drop in pressure over the upper surface of the piston 28 due to the ejector effect of the propulsion gases passing through the hole 30. In some cases these effects may combine to hold the piston 28 against the rocket in the early stages of launch and to make the latches 32 unnecessary. In some cases even the grooves 64 may be unnecessary since the contacting surfaces of the piston 28 and the transverse wall 8 will not be smooth and propulsive gases will find their way between them. Instead of the latches described other releasable connecting means such as shear pins may be employed.

Figure 5:
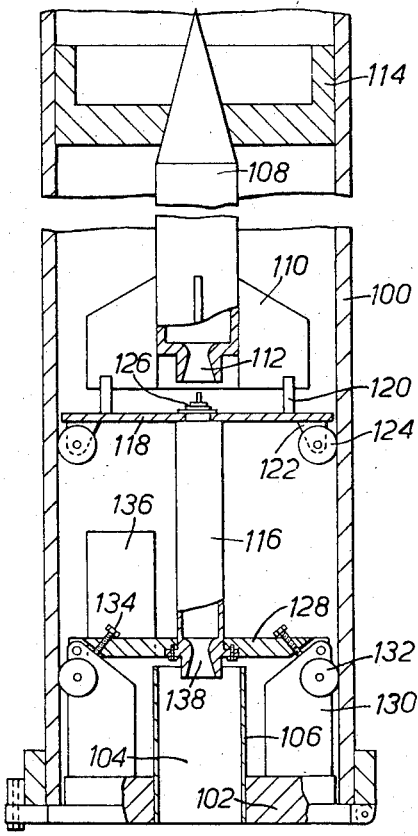
FIGURE 5 is a fragmentary longitudinal section, similar to FIGURE 2, of another rocket and launcher in accordance with the invention.

In the rocket and launcher assembly shown in FIGURE 5 the launcher comprises a tube 100 and a hinged transverse rear wall 102 similar to those employed in the first assembly described. The transverse wall 102 has a hole 104 extending through it and fixed in this hole is a short tube 106. The tube 100 contains a main rocket 108 having fins 110, an exit nozzle 112 and a guide member 114 all corresponding to the rocket shown in FIGURE 2. In addition there is a boost rocket 116 having a piston 118 fixed to its front end. This piston extends substantially right across the launcher tube 100 and has locating brackets 120 on its upper surface to receive the fins 110 of the rocket 108 and has brackets 122 carrying wheels 124 on its under-surface. These wheels engage the internal surface of the tube 100 to guide the rockets in their passage up the tube. The piston 118 also carries an igniter 126 which may be of any known construction and serves to ignite both the main rocket 108 and the booster rocket 116. The rear end of the booster rocket carries an open-work spider 128 to which are pivot spring-loaded fins 130 carrying wheels 132. The amount by which the fins can pivot inwards is limited by adjustable stops 134 and in the inner position the wheels 132 engage the inner surface of the tube 100 to assist the wheels 124 to guide the booster rocket. The spider 128 also carries a cannister 136 in which a parachute is stored. It will be seen that the fins 130 support the booster rocket from the transverse wall 102 with the nozzle 138 of the booster rocket projecting a short way into the tube 106.

In operation the igniter 126 will ignite the two rockets which will produce propulsive gases at such a rate that the booster rocket is held in engagement with the main rocket at least until the main rocket has almost reached the exit end of the tube 100. The main rocket may not produce much gas until it is a considerable way up the tube. In the early stages the propulsive gases from the nozzle 138 of the booster rocket will pass straight through the tube 106 and the hole 104 in the transverse wall 102 to uncontained atmosphere but after a short time the diameter of the jet from the nozzle 138 at the level of the tube 106 will be greater than the diameter of the tube 106 so that pressure will be built up behind the piston 118. As in the first example, acceleration will be substantially constant over most of the passage of the rockets up the rocket tube without any marked peak so that the maximum velocity of the main rocket when it leaves the launch tube can be obtained from a given maximum acceleration.

Obviously many modifications and variations of the invention are possible without departing from the novel spirit and scope of the invention.

What I claim as my invention and desire to secure by Letters Patent is:

1. In a rocket and launcher assembly comprising a rocket having at least one propulsion nozzle with an exit cone at its rear end, a launcher including a tube for containing said rocket and having an open delivery end and a rear end and support means for supporting said tube generally vertically and with said rear end clear of the ground, and a piston member to the rear of and separate from said rocket, said piston member extending transversely across said tube and movable along said tube, the improvement comprising means releasably connecting the piston to the rocket, an annular flange wall projecting inwards from the wall of the tube at the end of the tube opposite the delivery end to form an aperture which aperture extends directly through said flange wall to open directly rearwardly into unconfined air and is axially aligned with said nozzle, said piston member having an opening therein with a cross-sectional area larger than the cross-sectional area of the exit end of said nozzle and aligned with said nozzle, the cross-sectional area of said aperture being between five and twenty times the cross-sectional area of the exit end of said nozzle and about one tenth of the cross-sectional area of said tube whereby, when said rocket in said tube is adjacent said flange wall, gas passing out of said exit cone may pass rearwardly without deflection through said aperture to uncontained atmosphere immediately to the rear of said flange wall and said flange wall progressively intercepts gas passing out of said exit cone as said rocket travels towards the delivery end of said tube.

2. A rocket and launcher assembly according to claim 1 in which said transverse wall containing said aperture is secured to said tube by releasable connecting means.

3. A rocket and launcher assembly according to claim 2 in which said releasable connecting means comprise a hinge and a lock.

4. A rocket and launcher assembly according to claim 1 in which the means releasably connecting said piston member and said rocket comprises inertia-release latch means.

References Cited
UNITED STATES PATENTS

| | | | |
|---|---|---|---|
| 2,998,754 | 9/1961 | Bialy | 89—1.816 |
| 3,026,775 | 3/1962 | Musser | 89—1.7 |
| 3,084,600 | 4/1963 | Walker | 89—1.818 |
| 3,212,402 | 10/1965 | Hengel et al. | 89—1.813 X |

FOREIGN PATENTS

| | | |
|---|---|---|
| 444,851 | 2/1949 | Italy. |

SAMUEL W. ENGLE, *Primary Examiner.*